United States Patent
Song

(10) Patent No.: US 10,317,616 B2
(45) Date of Patent: Jun. 11, 2019

(54) DIFFUSION PLATE AND MANUFACTURING METHOD THEREOF, BACKLIGHT MODULE

(71) Applicants: BOE Technology Group Co., Ltd., Beijing (CN); Beijing BOE Optoelectronics Technology Co., Ltd., Beijing (CN)

(72) Inventor: Yong Song, Beijing (CN)

(73) Assignees: BOE Technology Group Co., Ltd., Beijing (CN); Beijing BOE Optoelectronics Technology Co., Ltd., Beijing (CN)

(*) Notice: Subject to any disclaimer, the term of this patent is extended or adjusted under 35 U.S.C. 154(b) by 310 days.

(21) Appl. No.: 14/893,861

(22) PCT Filed: May 30, 2015

(86) PCT No.: PCT/CN2015/080421
§ 371 (c)(1),
(2) Date: Nov. 24, 2015

(87) PCT Pub. No.: WO2016/095446
PCT Pub. Date: Jun. 23, 2016

(65) Prior Publication Data
US 2016/0356949 A1  Dec. 8, 2016

(30) Foreign Application Priority Data

Dec. 16, 2014  (CN) .......................... 2014 1 0783820

(51) Int. Cl.
*F21V 8/00* (2006.01)
*B29D 11/00* (2006.01)
(Continued)

(52) U.S. Cl.
CPC ...... *G02B 6/0088* (2013.01); *B29D 11/00663* (2013.01); *B29D 11/00798* (2013.01);
(Continued)

(58) Field of Classification Search
CPC .. G02B 5/0221; G02B 5/0268; G02B 6/0051; G02B 6/0088; B29D 11/00663; B29D 11/0798; B29D 11/00865; B29D 11/0875
(Continued)

(56) References Cited

U.S. PATENT DOCUMENTS 6,771,335 B2 * 8/2004 Kimura ................ G02B 5/0226
349/112
2004/0099974 A1  5/2004 Yang
(Continued)

FOREIGN PATENT DOCUMENTS

CN  1497271 A  5/2004
CN  1924667 A  3/2007
(Continued)

OTHER PUBLICATIONS

Jul. 25, 2016—(CN)—Second Office Action Appn 201410783820.2 with English Tran.
(Continued)

*Primary Examiner* — Collin X Beatty
*Assistant Examiner* — Grant A Gagnon
(74) *Attorney, Agent, or Firm* — Banner & Witcoff, Ltd.

(57) ABSTRACT

A diffusion plate is provided. The diffusion plate includes a diffusion plate substrate, wherein the diffusion plate substrate includes grooves configured to accommodate microstructures of a light guide plate. The groove has a width larger than that of the microstructure, and the groove has a depth larger than a height of the microstructure. A method of manufacturing the diffusion plate and a backlight module are also provided. The groove of the diffusion plate provided by embodiments of the disclosure combines with the microstructure on the surfaces of the light guide plate to form a stable structure together so that the relative movement between them is reduced, and the white spot problem caused by the microstructures being scratched is also reduced.

18 Claims, 3 Drawing Sheets

(51) Int. Cl.
*G02B 5/02* (2006.01)
*B29L 11/00* (2006.01)

(52) U.S. Cl.
CPC .. *B29D 11/00865* (2013.01); *B29D 11/00875* (2013.01); *G02B 5/0221* (2013.01); *G02B 5/0268* (2013.01); *G02B 6/0051* (2013.01); *B29L 2011/0075* (2013.01)

(58) Field of Classification Search
USPC .......................................................... 359/599
See application file for complete search history.

(56) References Cited

U.S. PATENT DOCUMENTS

| | | | | |
|---|---|---|---|---|
| 2008/0068716 A1* | 3/2008 | Goto | .................... | G02B 3/0056 359/599 |
| 2008/0186739 A1* | 8/2008 | Chen | .................... | G02B 6/0038 362/620 |

FOREIGN PATENT DOCUMENTS

| | | |
|---|---|---|
| CN | 101440935 A | 5/2009 |
| CN | 102364239 A | 2/2012 |
| CN | 203259677 U | 10/2013 |
| CN | 104459843 A | 3/2015 |
| JP | 2001305530 A | 10/2001 |
| JP | 200493941 A | 3/2004 |
| JP | 2009251544 A | 10/2009 |
| TW | 200834179 A | 8/2008 |

OTHER PUBLICATIONS

May 24, 2016—(CN)—First Office Action Appn 201410783820.2 with English Tran.
Sep. 11, 2015—International Search Report and Written Opinion Appn PCT/CN2015/080421 with English Tran.

\* cited by examiner

DIFFUSION PLATE AND MANUFACTURING METHOD THEREOF, BACKLIGHT MODULE

The application is a U.S. National Phase Entry of International Application No. PCT/CN2015/080421 filed on May 30, 2015, designating the United States of America and claiming priority to Chinese Patent Application No. 201410783820.2 filed on Dec. 16, 2014. The present application claims priority to and the benefit of the above-identified applications and the above-identified applications are incorporated by reference herein in their entirety.

TECHNICAL FIELD

Embodiments of the present disclosure relate to a diffusion plate and manufacturing method thereof, a backlight module.

BACKGROUND

With the improvement of people's living standard, the requirement for mobile phones are changing quickly. The future products of mobile phones tend to be thinner, high brightness, low power consumption, and high quality.

SUMMARY

Embodiments of the present disclosure provide a diffusion plate. The diffusion plate includes a diffusion plate substrate, wherein the diffusion plate substrate includes grooves configured to accommodate microstructures of a light guide plate, and each of the grooves has a width larger than that of the microstructures and a depth larger than a height of the microstructure.

In an example, the diffusion plate substrate further comprises protrusion structures located on positions other than positions of the grooves in the diffusion plate.

In an example, the protrusion structures comprises a plurality of protrusions having different heights.

In an example, the plurality of protrusions comprise a first protrusion, a second protrusion and a third protrusion.

In an example, the first protrusion has a first height larger than a second height of the second protrusion, and the second height of the second protrusion is larger than a third height of the third protrusion.

In an example, the protrusion is in a shape of sphere segment.

In an example, the protrusion in the sphere segment has a diameter of 2 µm-4 µm.

Embodiments of the present disclosure provide a method of manufacturing a diffusion plate, including: a step of forming a plurality of grooves configured to accommodate microstructures of a light guide plate on surfaces of a diffusion plate substrate; and a step of filling a part of grooves and allowing the remained of unfilled grooves to be corresponded to the microstructures of the light guide plate.

In an example, the step of forming of the plurality of grooves configured to accommodate microstructures of the light guide plate on the surface of the diffusion plate substrate includes: coating resin material on the surfaces of the diffusion plate substrate; forming grooves corresponding to the microstructures of the light guide plate by roller rolling; and curing the resin material.

In an example, the step of filling of the part of grooves and allowing the remained of unfilled grooves correspond to the microstructures of the light guide plate includes filling the part of grooves up; and curing the resin material.

In an example, in a case that the part of grooves are filled with the resin, the resin material is mixed with granules that are used to form the protrusion, the resin material mixed with the granules is filled into a corresponding groove via a transfer roller so that the grooves are filled up and a plurality of protrusions are formed.

Embodiments of the present disclosure further provide a backlight module, which includes the above diffusion plate.

BRIEF DESCRIPTION OF THE DRAWINGS

Embodiments of the present disclosure will be described in detail hereinafter in conjunction with accompanying drawings to allow one of ordinary skill in the art to understand the present disclosure more clearly, in which.

DETAILED DESCRIPTION

The technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by an ordinary skill in the art to which the present invention belongs. The terms, such as "first," "second" or the like, which are used in the description and the claims of the present application, are not intended to indicate any sequence, amount or importance, but for distinguishing various components. Also, the terms, such as "a/an," "one," "the/the" or the like, are not intended to limit the amount, but for indicating the existence of at lease one. The terms, such as "comprise/comprising," "include/including" or the like, are intended to specify that the elements or the objects stated before these terms encompass the elements or the objects and equivalents thereof listed after these terms, but not preclude other elements or objects. The terms, such as "On," "under," or the like, are only used to indicate relative position relationship, and if the position of the object which is described is changed, the relative position relationship may be changed accordingly.

Figure 1:
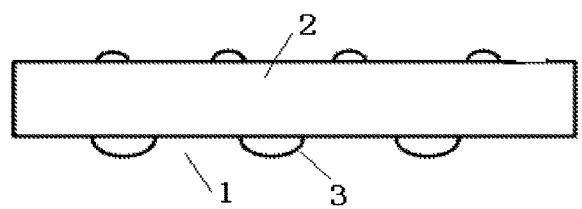
FIG. 1 is a schematic structural view of a light guide plate.

To improve brightness of products, a liquid crystal display module (LCM) is improved mainly by: 1) using a higher brightness of LED; 2) using a better gain of prism; 3) using a light guide plate structure having Vcut structure, as shown in FIG. 1, the protrusion of the surface of the light guide plate is the Vcut structure (also referred to as microstructure). The first two manners can not make further contribution due to the limitation of current industry technical ability. The latest technology of the light guide plate are continuously developed and used. For a light guide plate with microstructures, however, the biggest problem caused by the Vcut structure is the vibration white spot. The problem will occur when the microstructures are pressed during the complete machine or module state, or the microstructures are scratched in the vibration procedure, wherein the scratching is caused by the diffusion plate connected with the light guide plate movement.

As shown in FIG. 1, the light guide plate 1 includes a light guide plate body 2 and microstructures 3 formed on the surfaces of the light guide plate.

Figure 2:
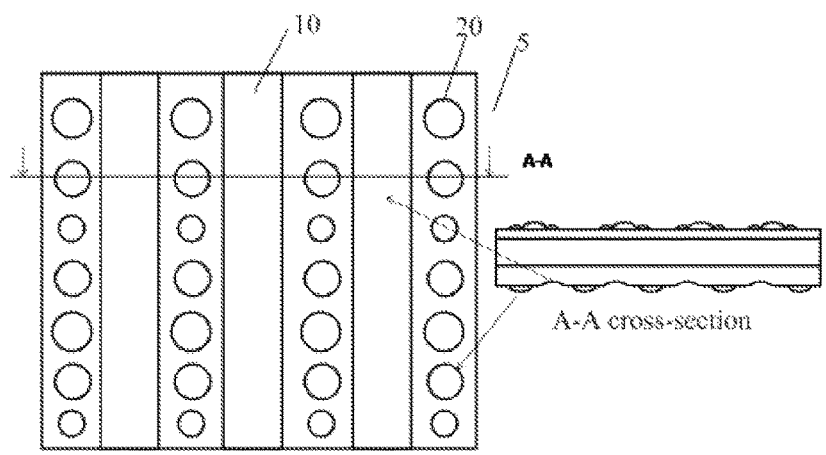
FIG. 2 shows a schematic structural view and a cross-section view along A-A of a diffusion plate according to an embodiment of the present disclosure.
Figure 3:
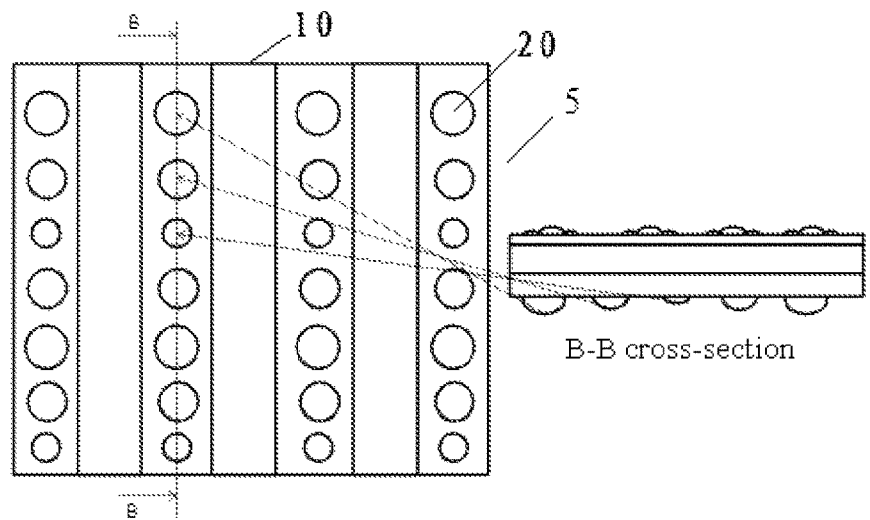
FIG. 3 is a cross-section view along B-B of FIG. 2.
Figure 4:
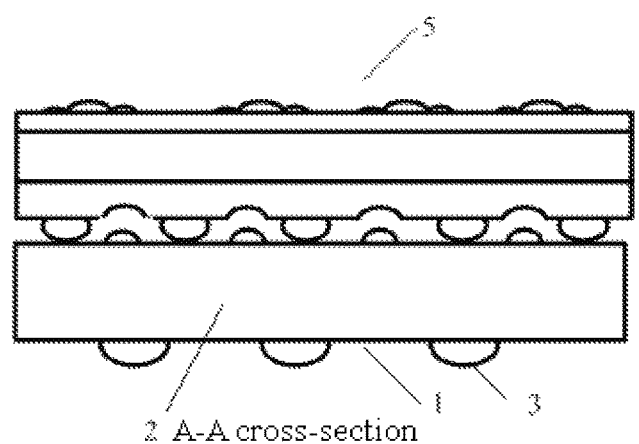
FIG. 4 is a schematic view of a diffusion plate arranged on a light guide plate according to an embodiment of the present disclosure.
Figure 5:
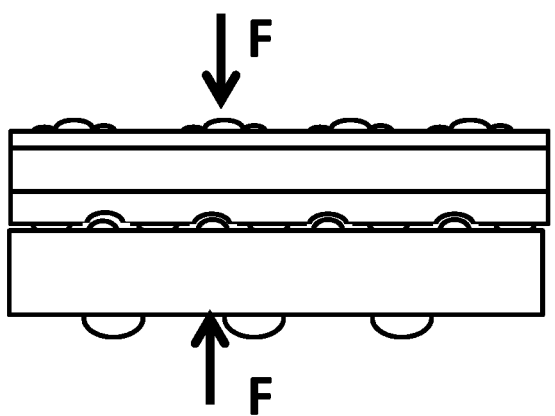
FIG. 5 is a schematic view of a diffusion plate arranged and pressed on a light guide plate according to an embodiment of the present disclosure

As shown in FIGS. 2 and 3, the diffusion plate/diffuser provided by embodiments of the present disclosure includes a diffusion plate substrate 5, the diffusion plate substrate 5 has grooves 10 configured to accommodate microstructures of the light guide plate 1 on the surfaces which contact with the light guide plate 1. To allow the grooves 10 fully accommodate the microstructures 3 formed on the surfaces of the light guide plate, a width of the groove 10 is larger than that of the microstructure 3 and a depth of the groove 10 is larger than a height of the microstructure 3. A size of the groove is depended on a size of the microstructure on the light guide plate 1. For example, the size of the groove is slightly larger than the size of the microstructure. The groove 10 combines with the microstructure 3 on the surface of the light guide plate 1 to form a stable structure to some extent, so that the relative movement amount between them is reduced, and the white spot problem caused by the microstructure being scratched is reduced.

For example, protrusion structures 20 are also formed at positions of the surface of the diffusion plate contacting with light guide plate other than the groove positions. The protrusion structures 20 act as a support between the diffusion plate and the light guide plate 1 so that the top of the microstructures 3 would not be pressed by the bottom of the grooves 10 when being pressed. If the top of the microstructures 3 were pressed by the bottom of the grooves 10, it would cause the top of the microstructures 3 to be scratched due to big pressure even if a slight movement occurs.

In an example, the protrusion structures 20 have a same size, so that all of the protrusion structures 20 would be deformed equally, and all of them can act as a support when they are subjected to a pressure.

In another example, the protrusion structure 20 can include a first protrusion 21, a second protrusion 22 and a third protrusion 23, and the sizes (for example, height) of the three protrusions are different from each other. For example, the height of the first protrusion 21 is taller than that of the second protrusion 22, and the height of the second protrusion 22 is taller than that of the third protrusion 23. In this manner, a part of protrusions act as a support when being subjected to a certain pressure; if being subjected to a larger pressure, more protrusions or all protrusions would act as supports, so that it would produce an effect of gradual supporting. It can prevent the protrusion structure 20 being damaged by a large pressure, so that it can avoid the top of the microstructures being pressed by the bottom of the grooves when being pressed.

In this embodiment, the protrusion 20 is in a shape of sphere segment. The protrusion in the sphere segment has a diameter of 2 μm-4 μm. The protrusion can also be other shapes adapted to the height of the microstructures on the light guide plate.

An embodiment of the present disclosure further provides a method of manufacturing a diffusion plate. The method includes forming a plurality of grooves configured to accommodate microstructures of the light guide plate on surfaces of the diffusion plate substrate. The different light guide plates may have different arrangements of the microstructures, a part of grooves are filled and the remained of unfilled grooves correspond to the microstructures of the light guide plate based on the arrangement of the microstructures of the light guide plate to be cooperated with the diffusion plate.

In this embodiment, the step of forming the plurality of grooves configured to accommodate the microstructures of the light guide plate on the surfaces of the diffusion plate substrate can include: coating resin material on the surfaces of the diffusion plate substrate, forming grooves corresponding to the microstructures of the light guide plate by roller rolling; and curing the resin material.

In this embodiment, the step of filling a part of grooves and allowing the remained of unfilled grooves to be corresponded to the microstructures of the light guide plate includes: filling the part of grooves with resin material and curing the resin material.

For example, in a case that the part of grooves are filled with resin material, the resin material is mixed with granules that are used to form the protrusion, the resin material mixed with the granules is filled into a corresponding groove via a transfer roller. Then, it is cured so that the grooves are filled up and a plurality of protrusions are formed. The transfer roller is a roller with a sieve-like structure. The surface of the transfer roller is formed with grooves having different diameters, and the mixed resin flows down from the transfer roller. The transfer roller firstly sticks required granules through the grooves on the transfer roller, then performs a transferring process on a corresponding substrate, so that the granules on the transfer roller are transferred to the substrate.

An embodiment of the present disclosure further provides a backlight module including the above diffusion plate.

The embodiments of the present disclosure form grooves configured to accommodate the microstructures of the light guide plate on the surfaces, which contact with the light guide plate, of the diffusion plate. The groove combines with the microstructure on the surface of the light guide plate to form a fixed structure to some extent, so that the relative movement amount between them is reduced, and the white spot problem caused by the microstructure being scratched is also reduced.

It should be understood that the described above are only illustrative embodiments of the present disclosure, and the present disclosure is not intended to limited thereto. For one of ordinary skill in the art, various modifications and improvements may be made without departing from the spirit and scope of embodiments of the present disclosure, and all of which and equivalent solutions should fall within the protection scope of the present disclosure. The scope of the present disclosure is defined by the claims.

The present disclosure claims priority of Chinese patent application No. 201410783820.2 filed on Dec. 16, 2014 and entitled "DIFFUSION PLATE AND MANUFACTURING METHOD THEREOF, BACKLIGHT MODULE", the entire contents of which are incorporated herein for reference.

What is claimed is:
1. A diffusion plate, comprising:
 a diffusion plate substrate, wherein the diffusion plate substrate includes grooves in positions below a surface of the diffusion plate substrate and configured to accommodate microstructures of a light guide plate to be connected and contacted with the diffusion plate substrate, and each of the grooves has a width larger than that of the microstructures and each of the grooves has a depth larger than a height of the microstructures; and protrusion structures located on positions on the surface of the diffusion plate substrate other than the positions of the grooves below the surface of the diffusion plate substrate and configured to be supports between the diffusion plate and the light guide plate, the grooves and protrusion structures being extended in two opposite directions from and perpendicular to a same surface of the diffusion plate substrate.

2. The diffusion plate according to claim 1, wherein the protrusion structures comprise a plurality of protrusions having different heights.

3. The diffusion plate according to claim 2, wherein each of the protrusions is in a shape of a sphere segment.

4. The diffusion plate according to claim 3, wherein the sphere segment has a diameter of 2 µm-4 µm.

5. The diffusion plate according to claim 2, wherein the plurality of protrusions comprises a first protrusion, a second protrusion, and a third protrusion.

6. The diffusion plate according to claim 5, wherein each of the protrusions is in a shape of a sphere segment.

7. The diffusion plate according to claim 5, wherein the first protrusion has a first height larger than a second height of the second protrusion, and the second height of the second protrusion is larger than a third height of the third protrusion.

8. The diffusion plate according to claim 7, wherein each of the protrusions is in a shape of a sphere segment.

9. A method of manufacturing a diffusion plate, comprising:
forming a plurality of grooves to accommodate microstructures of a light guide plate to be connected and contacted with the diffusion plate in positions below a surface of a diffusion plate substrate;
filling a part of the grooves and allowing remaining unfilled grooves to be corresponded to the microstructures of the light guide plate; and
forming protrusion structures located on positions other than the positions of the grooves on the surface of the diffusion plate substrate to be supports between the diffusion plate and the light guide plate, the grooves and protrusion structures being extended in two opposite directions from and perpendicular to a same surface of the diffusion plate substrate.

10. The method according to claim 9, wherein the forming the plurality of grooves comprises:
coating resin material on the surface of the diffusion plate substrate;
forming grooves corresponding to the microstructures of the light guide plate by roller rolling; and
curing the resin material.

11. The method according to claim 9, wherein the filling the part of the grooves comprises filling the part of the grooves up with a resin material, the method further comprising:
curing the resin material.

12. The method according to claim 11, wherein in a case that the part of the grooves are filled with the resin material, the resin material is mixed with granules used to form a protrusion, the resin material mixed with the granules is filled into a corresponding groove via a transfer roller so that the grooves are filled up and a plurality of protrusions are formed.

13. A backlight module, comprising a diffusion plate, wherein the diffusion plate comprises:
a diffusion plate substrate, wherein the diffusion plate substrate includes grooves in positions below a surface of the diffusion plate substrate and configured to accommodate microstructures of a light guide plate to be connected and contacted with the diffusion plate substrate, and each of the grooves has a width larger than that of the microstructures of the light guide plate, and each of the grooves has a depth larger than a height of the microstructures; and
protrusion structures located on positions on the surface of the diffusion plate substrate other than the positions of the grooves below the surface of the diffusion plate substrate and configured to be supports between the diffusion plate and the light guide plate, the grooves and protrusion structures being extended in two opposite directions from and perpendicular to a same surface of the diffusion plate substrate.

14. The backlight module according to claim 13, wherein the protrusion structures comprise a plurality of protrusions having different heights.

15. The backlight module according to claim 14, wherein the plurality of protrusions comprises a first protrusion, a second protrusion, and a third protrusion.

16. The backlight module according to claim 15, wherein the first protrusion has a first height larger than a second height of the second protrusion, and the second height of the second protrusion is larger than a third height of the third protrusion.

17. The backlight module according to claim 14, wherein each of the protrusions is in a shape of a sphere segment.

18. The backlight module according to claim 17, wherein the sphere segment has a diameter of 2 µm-4 µm.

* * * * *